March 17, 1964  A. WINKLER ETAL  3,125,010
CAMERA CONTROLS
Filed Dec. 15, 1959  3 Sheets-Sheet 1

INVENTORS
ALFRED WINKLER
BY DIETER ENGELSMANN

March 17, 1964

A. WINKLER ETAL 3,125,010

CAMERA CONTROLS

Filed Dec. 15, 1959

INVENTOR.
ALFRED WINKLER
BY DIETER ENGELSMANN

United States Patent Office 3,125,010
Patented Mar. 17, 1964

3,125,010
CAMERA CONTROLS
Alfred Winkler and Dieter Engelsmann, Munich, Germany, assignors to Agfa Aktiengesellschaft, Leverkusen-Bayerwerk, Germany
Filed Dec. 15, 1959, Ser. No. 859,739
Claims priority, application Germany Dec. 19, 1958
26 Claims. (Cl. 95—10)

The present invention relates to cameras.

More particularly, the present invention relates to cameras which are capable of automatic operation.

One of the objects of the present invention is to provide a camera with a means which will make it possible for the operator in a simple convenient manner to operate the camera either automatically or by hand.

It is also an object of the present invention to provide a camera construction which will enable the operator not only conveniently and easily to operate the camera automatically or by hand but also to set the camera with easy convenience for operation with flash illumination.

An additional object of the present invention is to provide an arrangement wherein when the camera is set for automatic operation, manual operation is reliably prevented and when the camera is set for manual operation, automatic operation is reliably prevented.

It is a further object of the present invention to provide structure capable of accomplishing all of the above objects and at the same time composed of simple rugged elements which are very reliable in operation.

With the above objects in view the present invention includes in a camera a rotary exposure time setting means and a rotary aperture setting means. An automatic means is provided for automatically setting the exposure time setting means and the aperture setting means. A manually operable means is provided to release the automatic means for operation, and the camera also includes a shutter operating means. In accordance with the present invention a manually operable selecting means is available to the operator for selectively setting up the camera for manual or automatic operation. Also, the camera includes a blocking means which has a blocking position cooperating with the shutter operating means to prevent operation of the latter. The selecting means of the invention when set for manual operation moves the blocking means to a position releasing the shutter for operation and blocking the manually operable means from actuation by the operator to release the automatic means for automatically actuating the exposure time setting means and aperture setting means, the latter two setting means being manually operable when the selecting means is set for manual operation. On the other hand, when the manually operable selecting means is set for automatic operation the blocking means is maintained by the selecting means in this position blocking operation of the shutter and the exposure time setting means and aperture setting means cannot be set manually and can only be set by the automatic means. This automatic means at this time can be set into operation by the manually operable means which after setting the automatic means into operation cooperates with the blocking means to move the latter away from its blocking position releasing the shutter for operation after the exposure time setting means and aperture setting means have been automatically set.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
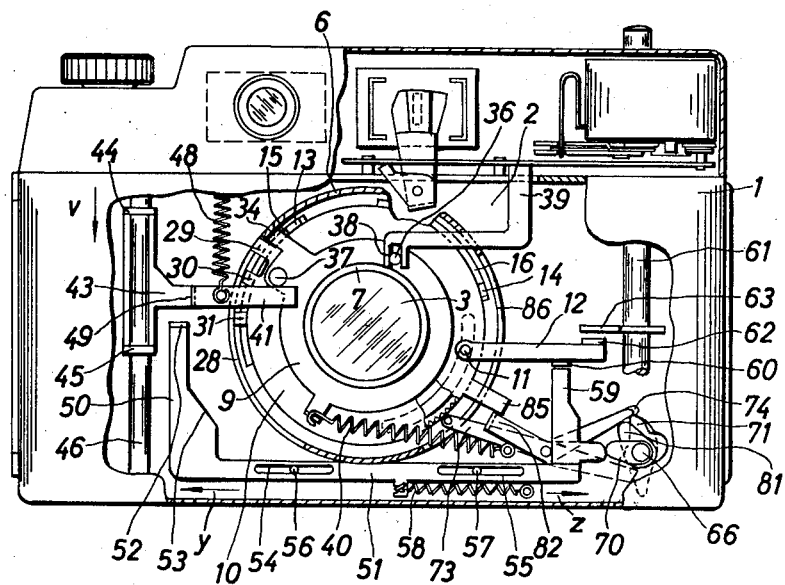
FIG. 1 shows a camera of the invention as seen from the rear with the rear wall broken away so as to clearly illustrate the structure of the invention.
Figure 2:
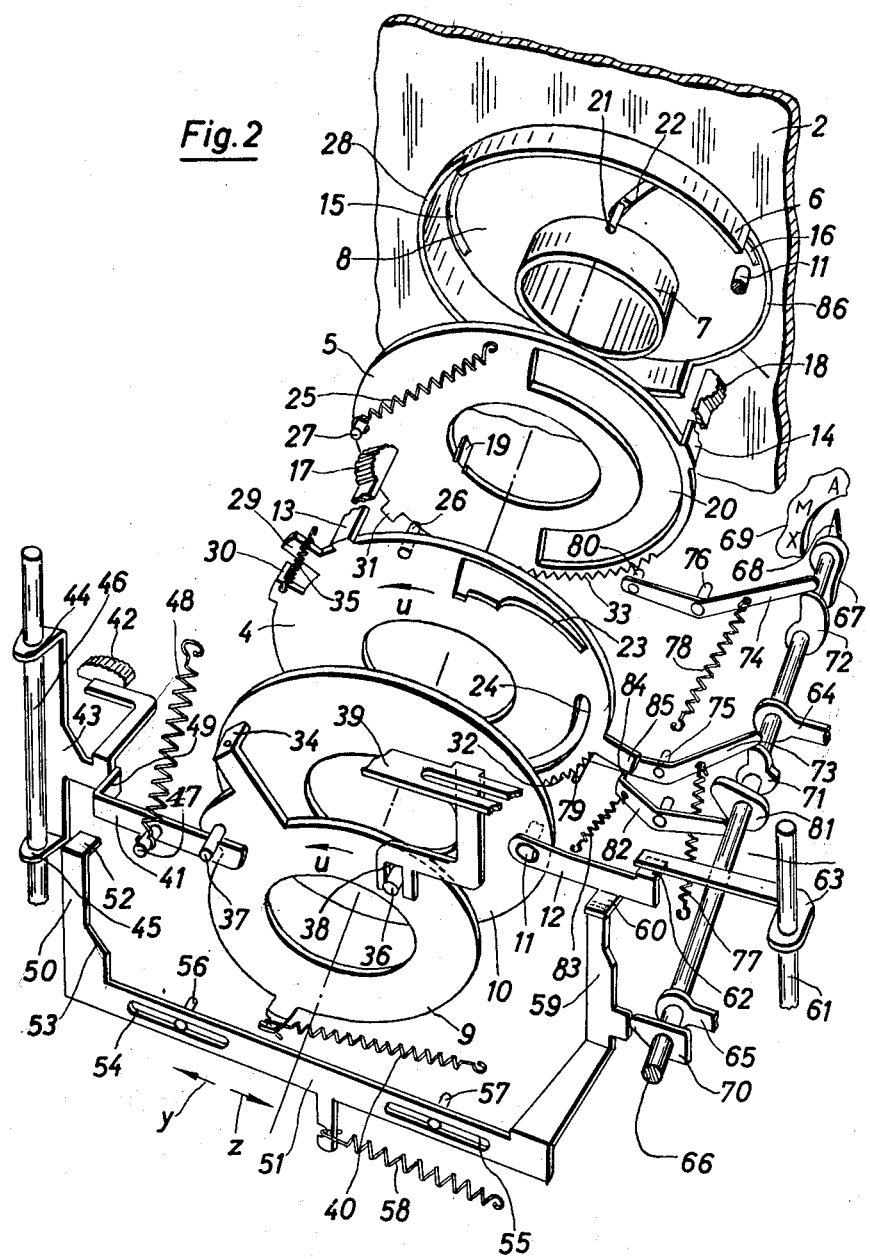
FIG. 2 is a perspective exploded view, on an enlarged scale as compared to FIG. 1, of the structure shown in FIG. 1.

Referring to FIGS. 1 and 2, it will be seen that the structure includes a camera housing 1 having a front wall 2 which carries an objective 3. A rotary exposure time setting means 4 is concentric with the objective 3 and turnable about the optical axis, and a rotary aperture setting means 5 is also concentric with the objective and turnable about the axis. The objective assembly includes an outer tubular wall 6 carried by the front wall 2 of the camera and the pair of setting means 4 and 5 are turnable within the outer tube 6, the pair of setting means 4 and 5 both being annular and surrounding an inner tube 7 located coaxially within the outer tube 6, so that the pair of setting means 4 and 5 are turnable about the inner tube 7 and within the outer tube 6. The inner tube 7 and the outer tube 6 are fixed with the shutter housing whose rear wall 8 is visible in the drawings. Also turnable about the inner tube 7 is a further setting ring 9, this setting ring 9 being automatically operable by structure responsive to the lighting conditions. Between the setting ring 9 and the exposure time setting ring 4 is located a covering plate 10 which is annular and which is stationary, this plate 10 covering the space between the tubes 6 and 7 and also being formed with an opening which serves as a bearing for the shutter release rod 11. This shutter release rod 11 is supported for turning movement about its axis in part by the cover plate 10, and a lever 12 is fixed to the rod 11 so that when the lever 12 is turned the rod 11 will turn.

The aperture setting ring 5 fixedly carries at its periphery an axially extending projection 14 while the exposure time setting means 4 fixedly carries at its periphery an axially extending projection 13. These axial projections 13 and 14 respectively extend through arcuate slots 15 and 16 formed in the wall 8, and they are freely accessible at the front of the camera to enable the aperture and exposure time to be manually set, these projections 13 and 14 respectively having at their outer free ends the knurled portions 17 and 18 facilitating manual engagement of projections 13 and 14 by the operator.

The aperture setting ring 5 fixedly carries at its inner periphery a forwardly extending axial projection 19 which extends through a slot in the wall 8 which is not visible in the drawing, and this part 19 serves to connect the aperture setting means 5 to the ring of the diaphragm which is connected to the diaphragm blades so as to adjust the latter in response to turning of this ring. Thus, the turning of the means 5 will through the projection 19 result in turning of the diaphragm ring so as to set the aperture. The rotary aperture setting means 5 is also formed with a cutout 20 having the configuration clearly shown in FIG. 2. The shutter release rod 11 extends through the cutout 20 and also a follower pin 21 of the time control mechanism (not shown in FIGS. 1 and 2) extends through the cutout 20 of the ring 5. The size of the cutout 20 is such that the aperture setting means 5 can be freely turned throughout its entire range without any engagement between the means 5 and the rod 11 or the follower pin 21.

The exposure time setting means 4 is formed with a cutout having a camming edge 23 engaged by the follower pin 21, and this camming edge 23 is suitably stepped so as to cooperate with the pin 21 to actuate the timing mechanism so as to provide the desired exposure times according to the angular position of the exposure time setting ring 4. The rotary exposure time setting ring 4 is formed with an arcuate cutout 24 through which the shutter release rod 11 extends, and the length of the cutout 24 is such that the exposure time setting means 4 can be turned through its entire range without any engagement between either end of the cutout 24 with the shutter release rod 11.

A spring 25 interconnects the pair of setting means 4 and 5 with each other. Thus, the aperture setting means 5 fixedly carries a pin 27 to which one end of the spring 25 is fixed, while the exposure time setting means 4 fixedly carries a pin 26 to which other end of the spring is connected. The exposure time setting means 4 is additionally provided with a radial projection 29 extending outwardly beyond its outer periphery through a cutout 28 formed in the outer tube 6. Also the exposure time setting means 4 carries at its outer periphery an axial projection 30 extending parallel to the optical axis and cooperating with a radial projection 31 at the outer periphery of the aperture setting means 5 in such a way that when the exposure time setting ring 4 has been turned through a sufficient angle the axial projection 30 will engage the radial projection 31 to move the latter and the ring 5 therewith.

A pair of detent means are provided to cooperate with the pair of setting means 4 and 5, respectively, for releasably maintaining the latter in positions to which they are manually turned, and this pair of detent means includes a series of ratchet teeth 32 fixedly carried by the ring 4 at an exterior peripheral portion thereof and a series of ratchet teeth 33 fixedly carried by the ring 5 at an exterior peripheral portion thereof. The pair of detent means includes in addition to the two pairs of ratchet teeth 32 and 33 a pair of pawls which respectively cooperate with the ratchet teeth as described below.

The third adjusting ring 9 is provided at its outer periphery with a projection 34 terminating in an axially extending portion which is pulled by spring 35 into engagement with the right edge of projection 29 of exposure time setting means 4, as viewed in FIG. 2, this spring 35 being connected at one end to part 30 of ring 4 and at its other end to projection 34 of ring 9. Spring 35 is stronger than spring 25. In addition the ring 9 fixedly carries a pair of axially extending pins 36 and 37. The pin 36 is located in a bifurcated portion 38 of a shiftable control member 39 forming part of an automatic means for automatically operating the exposure time setting means and aperture setting means, the ring 9 and the structure connected thereto also forming part of this automatic means. The control member 39 is formed with slots through which stationary pins extend so as to guide the control member 39 for movement to the right and left transversely with respect to the optical axis along a straight line. This control member 39 is operatively connected with the structure which measures the light and when the automatic structure is released for operation, the control member 39 is permitted to move through an extent which is determined by the amount of light received by the light meter. Upon release of the automatic means, the spring 40 acts on the ring 9 to turn the latter in the direction $u$ shown in FIG. 2, and the ring 9 turns in this direction simultaneously moving the control member 39 until the movement of the latter and thus of the ring 9 is terminated by the structure which is responsive to the amount of light. In the rest position of the parts the pin 37 which is fixed to the ring 9 rests against a control arm 41 of a manually operable means which includes the manually engageable portion 42 freely accessible to the operator. The manually operable means 43 which includes the arm 41 and the manually engageable portion 42 also includes a pair of apertured ears 44 and 45 through which a stationary guide rod 46 extends so that the manually operable means 43 is movable vertically along the vertical guide rod 46, a spring 48 being connected at its upper end to a stationary part of the camera and at its lower end to a pin 47 fixedly carried by the arm 41 for urging the manually operable means 43 upwardly to a rest position illustrated in FIGS. 1 and 2 where the arm 41 maintains the pin 37 at the illustrated position in opposition to the spring 40, the spring 48 of course being stronger than the spring 40. The strength of spring 48 is such that it can hold rings 4, 5, and 9 in their rest positions in opposition to springs 25, 35 and 40.

The manually operable means 43 is stepped so as to have at the left end of the arm 41, as viewed in FIG. 2, a control portion 49 extending parallel to the optical axis. This control portion 49 is located over an upwardly directed arm 50 at the left end of an elongated blocking means 51 in the form of a bar slidable in the directions $y$ and $z$, this blocking means 51 being formed with slots 54 and 55 through which stationary pins 56 and 57 extend so that in this way the blocking means 51 is guided for movement transversely of the optical axis in a horizontal direction to the right or left. The arm 50 terminates at its top end in a horizontally extending portion 52 adapted to be engaged by the portion 49 in certain positions of the parts, as described below. Thus when the end portion 52 of the arm is directly beneath the control portion 49 of the manually operable means 43 this arm 50 will block downward movement of the manually operable means 43. The arm 50 is provided intermediate its top and bottom ends with an inclined camming surface 53 which also cooperates with the control portion 49, the lower edge of the control portion 49 forming a second camming surface cooperating with the inclined camming surface 53. It will be noted that the manually operable means 43 is vertically movable in the direction $v$ which is perpendicular to the horizontal directions $y$ and $z$ of the blocking means 51. In the position of the part which is shown in FIGS. 1 and 2 the upper end 52 of the arm 50 is located just to the left of the control portion 49 so that when the operator moves the manually operable means 43 downwardly along the guide rod 46 the lower camming edge of the control portion 49 will engage the inclined camming edge 53 of the arm 50 to move the blocking means 51 in the direction of the arrow $y$. A spring 58 is connected with the blocking means 51 to urge the latter in the direction of the arrow $z$. The blocking means 51 also includes an arm 59 terminating at its top end in a blocking portion located beneath a projection 60 of the shutter operating lever 12. In the position of the parts illustrated in FIGS. 1 and 2 the arm 59 is directly beneath the portion 60 of the lever 12 so that the shutter cannot be operated and the blocking means 51 is shown in FIGS. 1 and 2 in its blocking position with respect to the shutter. The camera includes a shutter operating plunger 61 which is moved downwardly by the operator in order to release the shutter, and the plunger 61 fixedly carries a plate 63 extending over the projection 62 of the lever 12 so that when the plunger 61 is moved downwardly the plate 63 will engage the portion 62 of the lever 12 to turn the latter and release the shutter provided of course that the portion 59 of the blocking means 51 is not beneath the portion 60 of the lever 12. With the parts as shown in FIG. 1 the downward movement of the plunger 61 is prevented and the operator cannot release the shutter.

The structure of the invention also includes a selecting means operable by the operator for selectively placing the parts in a condition either for manual operation, for automatic operation, or for operation with flash illumination. This selecting means includes an elongated shaft means 66 extending parallel to the optical axis and supported for rotation about its own axis in stationary bearings 64 and 65 fragmentarily illustrated in FIG. 2. The turnable selecting rod 66 extends through the front wall of the camera and carries in front of the front wall a knob 67 accessible to the operator for adjusting the angular position of the shaft means 66. The knob 67 carries an index 68 which cooperates with a scale 69 visible at the front of the camera wall 2 and cooperating with the pointer 68. This scale includes a symbol "A" indicating setting for automatic operation, a symbol "M" indicating a setting for manual operation without flash illumination, and a symbol "X" indicating setting of the camera for operation with flash illumination.

The selector shaft means 66 fixedly carries a cam 70 located in the same plane as the arm 59 of the blocking means 51. The spring 58 urges the blocking means 51 in the direction of the arrow z so as to maintain the arm 59 in engagement with the cam 70. Thus, in the rest position of the parts shown in FIG. 2 the arm 59 engages the cam 70, and the parts are also shown in this position in FIG. 1. The shape of the cam 70 is such that when the shaft 66 is set by the operator for automatic operation with the index 68 aligned with the symbol "A," the cam 70 locates the arm 59, as illustrated in FIGS. 1 and 2, directly beneath the portion 60 of the shutter operating means 12, while the arm 50 of the blocking means 51 assumes a position where the camming edge 53 is located beneath the portion 49 of the manually operating means 43. When the shaft 66 is turned by the operator to the position "M" for manual operation or "X" for flash operation the cam 70 allows the spring 58 to move the blocking means 51 in the direction of the arrow z through a distance sufficient to locate the arm 59 to the right of the portion 60 thus freeing the shutter operating means 12 for operation, and in this position of the parts the upper end portion 52 of the arm 50 located directly beneath the portion 49 of the manually operating means 43 so that in this position, which is to say either the "M" or "X" positions, the shutter can be manually released but the manual operating means 43 cannot be depressed should the operator push down on the finger piece 42 since the portion 49 of the means 43 will engage the upper end 52 of the arm 50 and thus will not be able to be moved downwardly along the guide rod 46.

The shaft 66 carries in addition a pair of cams 71 and 72 respectively cooperating with the pawls 73 and 74 which form part of the detent means for releasably holding the exposure time setting means 4 and the aperture setting means 5 in the angular position to which they are turned by the operator. The pawls 73 and 74 are in the form of two-armed levers respectively turnably carried by the pair of stationary pivot pins 75 and 76 which are fixedly mounted in the camera and a spring 78 cooperates with the pawl 74 to urge the latter in a clockwise direction as viewed in FIG. 2, so as to maintain the pawl 74 in engagement with the cam 72 so as to urge the pin 80 carried by the two-armed lever into engagement with the teeth 33 of the detent means which cooperates with the rotary aperture setting means 5. In the same way, a spring 77 cooperates with the pawl 73 to urge the latter in a clockwise direction, as viewed in FIG. 2, thus maintaining the pawl in engagement with the cam 71 and also urging the pin 79 which is carried by the two-armed lever 73 into engagement with the teeth 32. The shape of the cam 71 is such that when the shaft 66 is set for automatic operation and for flash operation the pin 79 is maintained out of the range of the teeth 32, while when the shaft 66 is set for manual operation the pin 79 will cooperate with the teeth 32 for releasably maintaining the exposure time setting means 4 in a given angular position. On the other hand, the shape of the cam 72 is such that the pin 80 is spaced from and maintained out of contact with the teeth 33 only when the shaft 66 is set for automatic operation. In the positions for manual operation and flash operation the pin 80 engages the teeth 33 to maintain the aperture setting means 5 in a given angular position.

The shaft 66 also fixedly carries a cam 81 which cooperates with a lever 82 which is turnably supported intermediate its ends by a stationary pivot pin. A spring 83 cooperates with the lever 82 to urge the right end thereof, as viewed in FIG. 2, against the cam 81. The exposure time setting means 4 includes a radial projection 85 which is adapted to cooperate with the free end 84 of the lever 82, this end 84 being curved so as to extend beneath the projection 85 in the manner shown in FIG. 2. The projection 85 engages the end 84 of lever 82 in the position of the parts shown in FIG. 2 simply because the exposure time setting means 4 happens to be at an extreme end position. The lever 82 has no influence on the projection 85 at this time and the ring 4 can be turned freely in the direction of the arrow u while the lever 82 remains in the position shown in FIG. 2. The angular position of the cam 81 is such that when the camera is set for automatic and manual operation the lever 82 will simply remain in the position shown without having any influence on the exposure time setting means. However, when the shaft 66 is turned so as to place the index 68 in alignment with the symbol "X," to set the camera for flash operation, the cam 81 cooperates with the lever 82 to turn the latter sufficiently to cause the projection 85 and the exposure time setting means 4 therewith to turn to an angular position which will automatically introduce into the camera an exposure time suitable for use with flash operation, such an exposure time being, for example, $\frac{1}{60}$ sec.

The outer tube 6 is formed at its right side, as viewed in FIG. 2, with an elongated cutout 86 through which the projection 85 freely extends, the cutout 86 being long enough to provide unrestrained turning of the projection 85 through the desired range, and the cutout 86 also provides a space through which the pawls 74 and 73 extend into engagement with the teeth 33 and 32, respectively.

The camera is illustrated in FIGS. 1 and 2 set for automatic operation, and in order to make an exposure at this time the operator engages the finger piece 42 and moves it downwardly in the direction of the arrow v. Thus, the arm 41 moves downwardly so as to release the pin 37 and the spring 40 can now turn the ring 9 in the direction of the arrow u shown in FIG. 2. In this way the manually operable release means 43 is actuated to release the automatic means which includes the shifting member 39 for operation. According to the amount of light received by the light meter and structure associated therewith as shown at the upper right of FIG. 1, the spring 40 will turn the ring 9 until the member 39 can move no longer to the left, as viewed in FIGS. 1 and 2, and thus the ring 9 will assume an angular position which is determined by the lighting conditions. The turning ring 9 through its projection 34 will cooperate with the exposure time setting means 4 to turn the latter also in the direction of the arrow u, and if it should happen that the lighting conditions are such that regulation of the aperture is required in addition to regulation of the exposure time then after the exposure time setting means 4 has been turned through a given angle by the ring 9 the continued turning of the ring 9 and setting means 4 will result, through cooperation of projection 30 with the projection 31 of the aperture setting means 5, in turning of the latter so as to set the aperture also, all of this movement terminating when the control member 39 stops moving in accordance with the structure which responds to the lighting conditions.

This automatic setting of the exposure time and exposure aperture takes place during the downward movement of the manually operable means 43 before the portion 49 thereof has engaged the camming edge 53 of the blocking means 51, so that during the time that the exposure time and exposure aperture are being automatically set the shutter operating means 12 is prevented from operating. The distance from the portion 49 of the manually operable means 43 to the camming edge 53 is such that even under circumstances where the largest amount of light is available so as to require the smallest settings of exposure time and exposure aperture the portion 49 will not engage the camming edge 53 until the exposure time and exposure aperture have been set. Then the continued downward movement of the manually operable means 43 will cause the bottom edge of the portion 49 to engage the camming edge 53 and thus move the blocking means 51 in opposition to the spring 58 in the direction of the arrow y so as to displace the arm 59 to the left of the portion 60 of the shutter operating lever 12 and thus free the latter for operation. Thus, with the finger piece 42 fully depressed the operator can move the plunger 61 downwardly, the top end of this plunger being accessible at the top of the camera, and the plate 63 will engage the portion 62 of the arm 12 to turn the latter and thus turn the rod 11 in order to trip the shutter and make the exposure. After the plunger 61 has been depressed in order to make the exposure, the operator releases the finger piece 42 so that the spring 48 returns the ring 9 and the exposure time setting means 4 to their starting positions, the aperture setting means 5 also rejoined to its starting position, and of course the spring 58 returns the blocking means 51 to the position where its arm 59 engages the cam 70 so that the shutter is again blocked from operation with the parts in the position shown in FIG. 2.

If it should be desired to operate the camera manually, then the operator engages the knob 67 so as to place the index 68 in alignment with the symbol "M," indicating that the camera is set for manual operation. In this way the shaft 66 and the cams 70, 71, 72 and 81 are turned to a different angular position. In this position the cams 71 and 72 have released the pawls 73 and 74 to the springs 77 and 78 so that the pins 79 and 80 engage the teeth 32 and 33, respectively, and thus the pair of detent means which respectively cooperate with the exposure time setting means and aperture setting means are now rendered operative. Now the operator by engaging the finger pieces 17 and 18 can set the camera manually at any desired exposure time and aperture, respectively, and the pair of detent means will maintain the exposure time and the aperture at the manual settings. Thus, the pair of detent means prevent the springs 40 and 25 from influencing the settings of the exposure time and exposure aperture and the pair of detent means will maintain the exposure time and exposure aperture at the desired setting in opposition to the springs 40 and 25.

When the shaft 66 has been turned by the operator to the angular position for manual operation, the cam 70 is turned to a position which frees the blocking means 51 to the spring 58 so that the blocking means 51 shifts to the right, in the direction of the arrow z, a distance sufficient to place the arm 59 out of the path of movement of the portion 60 of lever 12 so that the shutter can be operated at will, and furthermore the upper end 52 of the arm 50 is located beneath the portion 49 of the manually operable means 43 so that the latter cannot be operated at this time. When the parts are returned to the position for automatic operation, which is to say when the operator returns the shaft 66 to the position illustrated in FIG. 2, then the pins 79 and 80 are moved away from the teeth 32 and 33 so that the rings 4 and 5 are returned to their starting positions by the springs 40 and 25, respectively.

Should the operator desire to operate the camera with flash illumination, then the shaft 66 is turned so as to align the index 68 with the symbol "X." The result of this turning of the shaft 66 is that the cam 72 allows the pawl 74 to turn to an angle sufficient to place the pin 80 in engagement with the teeth 33. On the other hand, the pin 79 remains out of engagement with the teeth 32. Instead, the turning of the shaft 66 to the position for flash operation causes the cam 81 to act through the lever 82 on the projection 85 so as to turn the exposure time setting means 4 in the direction u through a relatively small angular distance sufficient to place the exposure time at a setting suitable for flash operation. In this position of the parts the cam 70 has turned to a position which frees the blocking means 51 for movement by the spring 58 in the direction of the arrow z through a distance sufficient to locate the arm 59 out of the path of downward movement of the portion 60 of the lever 12 so that the shutter in this position of the parts also is released for manual operation. At this time the portion 52 of the arm 50 is also located directly beneath the portion 49 of the manually operable means 43, so that the manually operable means cannot be actuated at this time to release the structure for automatically setting the camera.

Figure 3:
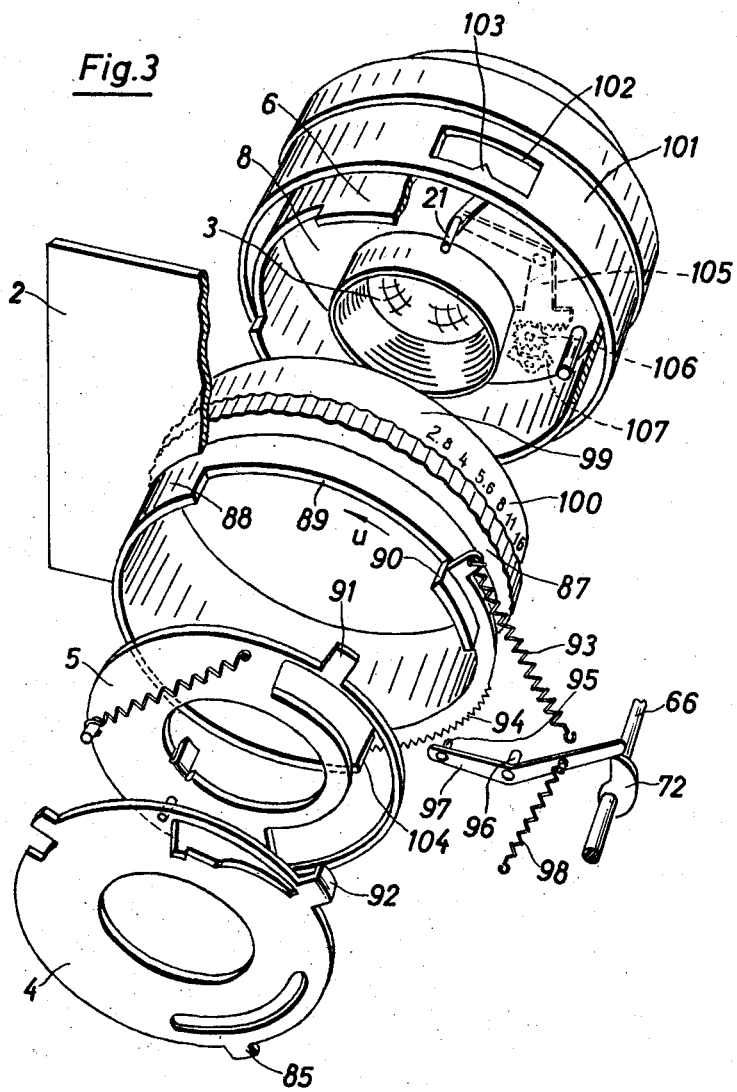
FIG. 3 is a perspective exploded view of part of a different embodiment of a structure according to the present invention.

FIG. 3 shows a second embodiment of the invention. In order to simplify the illustration of this embodiment those parts of the first embodiment which remain unchanged are not illustrated in FIG. 3, these unchanged parts being principally the portions of the shaft 66 not illustrated in FIG. 3, the blocking means 51, and the manually operable means 43. Also, the automatic means cooperating with the ring 9 to actuate the exposure time setting means 4 is identical.

With the embodiment of FIG. 3 a manually turnable ring 87 is provided, this ring being supported by the wall 2 for turning movement around the optical axis which coincides with the axis of the ring 87, and the ring or sleeve 87 surrounds the exposure time setting ring 4 and the aperture setting ring 5. The ring 87 is freely accessible at the front of the camera wall 2. The tubular portion 88 of the ring or sleeve 87 extends into the interior of the camera housing and is formed with a cutout 89 which terminates at one end in a control edge 90 extending parallel to the optical axis and cooperating with a radial projection 91 of the aperture setting means 5, this radial projection 91 corresponding to the radial projection 31 of FIGS. 1 and 2. This radial projection 91 is engaged in the rest position of the parts by an axial projection 92 of the exposure time setting means 4, this projection 92 being located within the tubular portion 88 of the sleeve 87 and this projection 92 corresponds to the projection 30 of the exposure time setting means 4 of FIG. 2. Thus, with this arrangement where the edge 90 and the projection 92 both engage the same edge of the projection 91, the aperture setting means 5 can be turned in the direction u either by the ring 87 or by the exposure time setting means 4. In the rest position of the parts the projection 92 engages but does not press against the projection 91

A return spring 93 is connected at one end to a stationary part of the camera housing and at its opposite end to the tubular portion 88 within the camera housing so as to urge the ring 87 to the illustrated rest position thereof, a suitable stop being provided to determine this rest position. In contrast to the embodiment of FIGS. 1 and 2, the pair of setting means 4 and 5 in FIG. 3 are not provided with any ratchet teeth forming part of a detent means. Instead, the detent means is provided on the manually turnable ring or sleeve 87 itself, this detent means taking the form of the teeth 94 fixed to the ring 87 for turning movement therewith including the pawl 97 turnable on the stationary pivot pin 96 and including the pin 95 which cooperates with the teeth 94, a spring 98 urging the pawl 97 in a clockwise direction, as viewed in FIG. 3, to maintain the pawl in engagement with the cam 72 of the shaft 66.

The ring 87 includes at the exterior of the camera a forwardly extending annular projection 99 provided with a scale 100 of aperture sizes. This annular projection 99 surrounds the tube 6 but is in turn surrounded by the exterior ring 101 which covers the projection 99 and which is fixed to the rear wall 3 of the shutter housing. This cover ring 101 is formed with a window 102 and carries an index 103 at this window, and the scale of aperture values 100 is so arranged that when the camera is set for automatic operation, as illustrated in FIG. 3, this scale is not visible through the window 102. However, the turning ring 87 will locate the aperture scale in the window 102.

The cutout 89 of the tubular portion 88 of the ring 87 enables the aperture setting means 5 to be turned through its entire range by means of the automatic exposure control device, and throughout the entire range of turning of the ring 5 by the automatic exposure control device the projection 91 will not engage the ends of the cutout 89. The tubular portion 88 of the ring 87 is also formed with a cutout 104 which permits the projection 85 of the exposure time setting means 4 to extend through to the exterior of the tube 88 so as to be engaged by the lever 82 in the manner described above for flash operation.

FIG. 3 shows the control lever 105 of the timing mechanism, this lever being turned by the feeler pin 21 which cooperates with the camming edge 23 of the exposure time setting ring 4, and the lever 105 has a toothed portion cooperating with a pinion 106 which acts as an escapement wheel cooperating with the escapement 107 for the purpose of controlling the exposure time in a well known manner, the parts 105—107 being shown in dotted lines in FIG. 3.

The automatic operation takes place with the structure of FIG. 3 in the same way as with the embodiment of FIGS. 1 and 2.

The parts are shown in FIG. 3 in the position they assume when the camera is set for automatic operation. When the camera is set for manual operation, the cam 72 turns to an angular position which places the pin 95 in engagement with the teeth 94 so that the ring 87 will remain in the position to which it is manually turned. The ring 87 will turn in the direction of the arrow $u$ at this time through a relatively small distance, in response to turning by the operator, until the control edge 90 engages the projection 91, and in this position the first aperture value will become aligned with the index 103. Through further manual turning of the ring 87 in the direction of the arrow $u$ the camera will be set to the desired aperture size. During this turning the control edge 90 cooperates with the projection 91 to turn the aperture setting means 5 to the desired angular position. When the camera has been set at the desired aperture value the operator releases the ring 87 and as a result of the detent means which is now operative the ring 87 will remain in its angular position. In this embodiment the exposure time setting means 4 automatically remains in the "B" position conventionally found on all cameras and indicating that the shutter will remain open for as long as the shutter release plunger is maintained depressed. Thus, with this embodiment the exposure time ring 4 will simply remain in the position corresponding to the conventional B setting of the exposure time, and thus the length of the exposure will be manually determined by the operator at this time.

When the shaft 66 of the embodiment of FIG. 3 is set for flash operation, the detent means remains operative with the spring 98 acting through the lever 97 on the tooth 95 to maintain the latter in engagement with the teeth 94, and the only difference is that, in the same way as with the embodiment of FIGS. 1 and 2, the cam 81 of the shaft 66 will cooperate with lever 82 to act on the projection 85 for placing the exposure time setting ring 4 at an angular position which will give an exposure time suitable for flash operation.

When the shaft 66 of FIG. 3 is returned to the angular position corresponding to automatic operation, the cam 72 again returns to the illustrated position, shown in FIG. 3, where the pin 95 is located beyond the teeth 94 so that now the ring 87 returns under the influence of the spring 93 automatically to its rest position, the turning at this time being in a direction opposite to the direction $u$ indicated in FIG. 3. Now the scale 100 is turned beyond the window 102 so that it is no longer visible through the window 102, and in the same way the exposure time setting means 4, as a result of the turning of the lever 82 away from the projection 85, returns under the action of the spring 40 to its starting position illustrated in FIG. 3.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, exposure time setting means; exposure aperture setting means; and means selectively operable by the operator and cooperating with said exposure time and aperture setting means for operating both of said setting means automatically prior to each exposure or for operating both of said setting means independently of each other by hand prior to each exposure.

2. In a camera, in combination, exposure time setting means; aperture setting means; spring means cooperating with both of said setting means for yieldably maintaining both of said setting means in predetermined rest positions; and means selectively operable by the operator and cooperating with said exposure time setting means and aperture setting means for setting said exposure time setting means and said aperture setting means in opposition to said spring means independently of each other prior to each exposure either automatically, by hand, or for flash operation, according to the will of the operator.

3. In a camera, in combination, rotary exposure time setting means; rotary aperture setting means; detent means cooperating with one of said setting means for releasably holding the latter in a given angular position when said detent means is operative; and selecting means cooperating with said aperture and exposure time setting means for selectively operating said aperture and exposure time setting means independently of each other prior to each exposure either automatically or by hand at the option of the operator, said selecting means cooperating with said detent means for rendering the latter operative when said selecting means is actuated to operate the two setting means by hand and for rendering the detent means inoperative when the two setting means are operated automatically.

4. In a camera, in combination, rotary aperture setting means; spring means operatively connected to said setting means for yieldably maintaining the latter in a predetermined rest position; detent means cooperating with said aperture setting means for releasably holding the latter in a given angular position; and manually operable means cooperating with said detent means for rendering the latter operative or inoperative at the option of the operator.

5. In a camera, in combination, rotary aperture setting means; detent means cooperating with said aperture setting means for releasably maintaining the latter at given angular positions when said detent means is operative; rotary exposure time setting means; and selecting means operable by the operator for selectively setting the camera for operating both of said setting means independently of each other prior to each exposure automatically, by hand, or with flash, said selecting means rendering said detent means inoperative when set for automatic operation, rendering said detent means operative when set for operation by hand, and rendering said detent means operative as well as setting said exposure time setting means at a given position when set to operate with flash.

6. In a camera, in combination, rotary exposure time setting means; rotary aperture setting means; shutter operating means; detent means cooperating with one of said setting means for releasably maintaining the latter at a given angular position when said detent means is operated; blocking means cooperating with said shutter operating means for blocking the operation of the latter when said blocking means is in a blocking position; manually turnable shaft means turnable by the operator to a selected angular position; and cam means carried by said shaft means and cooperating with said detent means and blocking means for rendering said detent means inoperative and said blocking means operative to unblock operation of said shutter operating means when said shaft means is placed by the operator in an angular position for automatic operation, said cam means moving said blocking means to an unblocking position and rendering said detent means operative when said shaft means is set by the operator to a position for hand operation.

7. In a camera, in combination, rotary exposure time setting means; rotary aperture setting means; shutter operating means; detent means cooperating with one of said setting means for releasably maintaining the latter at a given angular position when said detent means is operated; blocking means cooperating with said shutter operating means for blocking the operation of the latter when said blocking means is in a blocking position; manually turnable shaft means turnable by the operator to a selected angular position, cam means carried by said shaft means and cooperating with said detent means and blocking means for rendering said detent means inoperative and said blocking means operative to block operation of said shutter operating means when said shaft means is placed by the operator in an angular position for automatic operation, said cam means moving said blocking means to an unblocking position and rendering said detent means operative when said shaft means is set by the operator to a position for hand operation; and additional cam means carried by said shaft means and cooperating with said exposure time setting means for placing the latter in a given angular position when said shaft means is set to an angular position for flash operation.

8. In a camera, in combination, rotary exposure time setting means; rotary aperture setting means; shutter operating means; detent means cooperating with one of said setting means for releasably maintaining the latter at a given angular position when said detent means is operated; blocking means cooperating with said shutter operating means for blocking the operation of the latter when said blocking means is in a blocking position; manually turnable shaft means turnable by the operator to a selected angular position; and cam means carried by said shaft means and cooperating with said detent means and blocking means for rendering said detent means inoperative and said blocking means operative to block operation of said shutter operating means when said shaft means is placed by the operator in an angular position for automatic operation, said cam means moving said blocking means to an unblocking position and rendering said detent means operative when said shaft means is set by the operator to a position for hand operation, said shaft means extending parallel to the optical axis.

9. In a camera, in combination, rotary exposure time setting means; rotary aperture setting means; a pair of detent means respectively cooperating with the exposure time setting means and aperture setting means for releasably maintaining both of the latter means at a given angular position; and manually operable cam means cooperating with said pair of detent means for rendering the latter operative when said cam means is set by the operator to a position for hand operation of the camera and said cam means rendering said detent means inoperative when said cam means is set by the operator to a position for automatic camera operation.

10. In a camera, in combination, support means; rotary aperture setting means turnably carried by said support means; rotary exposure time setting means turnably carried by said support means; shutter operating means carried by said support means; detent means cooperating with one of said setting means for releasably maintaining the latter in a given angular position when said detent means is operative; blocking means cooperating with said shutter operating means to prevent operation of the latter when said blocking means is in a blocking position, said blocking means being carried by said support means for movement from blocking position to an unblocking position releasing said shutter operating means for operation; and manually operable means cooperating with said detent means and blocking means for rendering said blocking means operative and said detent means inoperative when said manually operable means is set in a position for automatic operation of the camera, said manually operable means moving said blocking means to an unblocking position thereof and said detent means to an operative condition when said manually operable means is set for manual operation of the camera.

11. In a camera, in combination, support means; rotary aperture setting means turnably carried by said support means; rotary exposure time setting means turnably carried by said support means; shutter operating means carried by said support means; detent means cooperating with one of said setting means for releasably maintaining the latter in a given angular position when said detent means is operative; blocking means cooperating with said shutter operating means to prevent operation of the latter when said blocking means is in a blocking position, said blocking means being carried by said support means for movement from blocking position to an unblocking position releasing said shutter operating means for operation; and manually operable means cooperating with said detent means and blocking means for rendering said blocking means operative and said detent means inoperative when said manually operable means is set in a position for automatic operation of the camera, said manually operable means moving said blocking means to an unblocking position thereof and said detent means to an operative condition when said manually operable means is set for manual operation of the camera, said blocking means having an arm located in the path of movement of a part of said shutter operating means when said blocking means is in said blocking position thereof.

12. In a camera, in combination, rotary aperture setting means; rotary exposure time setting means; detent means cooperating with at least one of said setting means for releasably holding the latter in a given angular position, said detent means including ratchet teeth carried by said one setting means and a pawl cooperating with said ratchet teeth; shutter operating means; blocking means having a blocking position blocking operation of said shutter operating means and an unblocking position releasing said shutter operating means for operation; tram means cooperating with said pawl and blocking means for controlling the positions of said pawl and blocking means, respectively; and spring means cooperating with said pawl and blocking means for maintaining said pawl and blocking means in engagement with said cam means.

13. In a camera, in combination, exposure time setting means; aperture setting means; shutter operating means; blocking means cooperating with said shutter operating means for blocking the operation thereof until said blocking means is moved from a blocking to an unblocking position; automatic means cooperating with said exposure time setting means and said aperture setting means for automatically operating said exposure time setting means and aperture setting means according to the lighting conditions; and manually operable means cooperating with said automatic means for setting the latter into operation, said manually operable means cooperating with said blocking means for moving the latter from said blocking to said unblocking position thereof after said exposure time setting means and said aperture setting means have been positioned by said automatic means.

14. In a camera, in combination, exposure time setting means; aperture setting means; shutter operating means; blocking means cooperating with said shutter operating means for blocking the operation thereof until said blocking means is moved from a blocking to an unblocking position; automatic means cooperating with said exposure time setting means and said aperture setting means for automatically operating said exposure time setting means and aperture setting means according to the lighting conditions; manually operable means cooperating with said automatic means for setting the latter into operation, said manually operable means cooperating with said blocking means for moving the latter from said blocking to said unblocking position thereof after said exposure time setting means and said aperture setting means have been positioned by said automatic means; selecting means cooperating with said exposure time setting means and said aperture setting means for selectively operating the latter either automatically or by hand according to the will of the operator, said selecting means cooperating with said blocking means for maintaining the latter in said blocking position thereof when said selecting means is set for automatic operation so that said blocking means will be moved by said manually operable means to said unblocking position thereof and said selecting means freeing said blocking means for movement to a second unblocking position different from said first unblocking position when said selecting means is set for manual operation.

15. In a camera, in combination, exposure time setting means; aperture setting means; shutter operating means; blocking means cooperating with said shutter operating means for blocking the operation thereof until said blocking means is moved from a blocking to an unblocking position; automatic means cooperating with said exposure time setting means and said aperture setting means for automatically operating said exposure time setting means and aperture setting means according to the lighting conditions; manually operable means cooperating with said automatic means for setting the latter into operation, said manually operable means cooperating with said blocking means for moving the latter from said blocking to said unblocking position thereof after said exposure time setting means and said aperture setting means have been positioned by said automatic means; and selecting means operable by the operator for selectively operating said exposure time setting means and aperture setting means by hand or automatically, said selecting means cooperating with said blocking means maintaining the latter in said blocking position thereof when said selecting means is set for automatic operation, said selecting means moving said blocking means to an unblocking position when said selecting means is set for manual operation.

16. In a camera, in combination, exposure time setting means; aperture setting means; selecting means selectively operable by the operator for actuating said exposure time setting means and aperture setting means manually or automatically; automatic means cooperating with said exposure time setting means and said aperture setting means for automatically actuating said exposure time setting means and said aperture setting means when said selecting means is set for automatic operation; manually operable means cooperating with said automatic means for actuating the latter; shutter operating means; and blocking means cooperating with said shutter operating means for blocking the operation thereof when said blocking means is in a blocking position, said manually operable means moving said blocking means from said blocking position thereof to an unblocking position releasing said shutter operating means for operation after said automatic means has actuated said exposure time setting means and said aperture setting means, said selecting means cooperating with said blocking means for maintaining the latter in said blocking position thereof when said selecting means is set for automatic operation, said blocking means unblocking said manually operable means to release the latter for operation when said blocking means is in said blocking position preventing operation of said shutter operating means, said selecting means when set for manual operation locating said blocking means in an unblocking position releasing said shutter operating means for operation and simultaneously blocking said manually operable means from operation so that the automatic means cannot be actuated by said manually operable means when said blocking means is in a position unblocking said shutter operating means while said selecting means is in the manually operable position.

17. In a camera, in combination, exposure time setting means; aperture setting means; selecting means selectively operable by the operator for actuating said exposure time setting means and aperture setting means manually or automatically; automatic means cooperating with said exposure time setting means and said aperture setting means for automatically actuating said exposure time setting means and said aperture setting means when said selecting means is set for automatic operation; manually operable means cooperating with said automatic means for actuating the latter; shutter operating means; and blocking means cooperating with said shutter operating means for blocking the operation thereof when said blocking means is in a blocking position, said manually operable means moving said blocking means from said blocking position thereof to an unblocking position releasing said shutter operating means for operation after said automatic means has actuated said exposure time setting means and said aperture setting means, said selecting means cooperating with said blocking means for maintaining the latter in said blocking position thereof when said selecting means is set for automatic operation, said blocking means unblocking said manually operable means to release the latter for operation when said blocking means is in said blocking position preventing operation of said shutter operating means, said selecting means when set for manual operation locating said blocking means in an unblocking position releasing said shutter operating means for operation and simultaneously blocking said manually operable means from operation so that the automatic means cannot be actuated by said manually operable means when said blocking means is in a position unblocking said shutter operating means while said selecting means is in the manually operable position, said selecting means also having a flash operating position and said selecting means locating said blocking means in the same position as for hand operation when said selecting means is set for flash operation.

18. In a camera, in combination, support means; aperture setting means and exposure time setting means carried by said support means; automatic means cooperating with said aperture and exposure time setting means for setting the latter automatically according to the lighting conditions; manually operable means cooperating with said automatic means for releasing the latter for operation; shutter operating means carried by said support means; and blocking means shiftably carried by said suppotr means for movement transversely of the optical axis and having a blocking portion cooperating with said shutter operating means when said blocking means is in a blocking position, said blocking means having an inclined camming surface and said manually operable means having a second camming surface cooperating with said inclined camming surface after said manually operable means has been actuated to release the automatic means for operation to shift said blocking means from said blocking to an unblocking position during cooperation of said camming surfaces.

19. In a camera, in combination, support means; aperture setting means and exposure time setting means carried by said support means; automatic means cooperating with said aperture and exposure time setting means for setting the latter automatically according to the lighting conditions; manually operable means cooperating with said automatic means for releasing the latter for operation; shutter operating means carried by said support means; and blocking means shiftably carried by said support means for movement transversely of the optical axis and having a blocking portion cooperating with said shutter operating means when said blocking means is in a blocking position, said blocking means having an inclined camming surface and said manually operable means having a second camming surface cooperating with said inclined camming surface after said manually operable means has been actuated to release the automatic means for operation to shift said blocking means from said blocking to an unblocking position during cooperation of said camming surfaces, said manually operable means moving before engagement of said second camming surface with said inclined camming surface through a distance sufficient to permit full operation of the automatic means and full setting of said exposure and aperture setting means under any lighting conditions.

20. In a camera, in combination, rotary exposure time setting means; rotary aperture setting means; manually turnable ring means coaxial with said exposure time and aperture setting means and turnable with respect thereto, said manually turnable ring means being turnable between a pair of end positions where said ring means gives maximum and minimum settings; and means carried in part by said ring means and in part by one of said setting means for transmitting movement of said ring means to one of said setting means during turning of said ring means in one direction from one to the other of said end positions thereof but not in the opposite direction.

21. In a camera, manually turnable ring means turnable for setting the camera and having a control surface portion; rotary aperture setting means and rotary exposure time setting means coaxial with said ring means, one of said setting means having a projection located in the path of turning movement of said control surface portion of said ring means so that in one direction of turning said ring means will place said control surface portion thereof in engagement with said projection to turn said one setting means while in the other direction of rotation of said ring means said one setting means will not be controlled by said ring means.

22. In a camera as recited in claim 1, manually turnable ring means forming part of said selectively operable means and having a control surface portion and carrying a scale of aperture settings, said aperture setting means being rotary and having a projection located in the path of turning movement of said control surface portion of said ring means so that when the latter turns in the direction placing said control surface portion thereof in engagement with said projection said aperture setting means will be adjusted; and annular covering means partly covering said ring means and formed with a window through which said scale is visible.

23. In a camera as recited in claim 1, said rotary aperture setting means and exposure time setting means both being rotary and said selectively operable means including a manually turnable ring means cooperating with one of said setting means for operating the latter and an automatic means cooperating with the other of said setting means for operating said other setting means, said other setting means cooperating with said one setting means for operating and setting said one setting means when said other setting means is automatically operated.

24. In a camera, in combination, aperture setting means; manually operable means cooperating with said aperture setting means for setting the latter manually at the option of the operator; exposure time setting means; automatic means cooperating with said exposure time setting means for setting the latter automatically; and means carried by said exposure time setting means and cooperating with said aperture setting means for setting the latter automatically when said exposure time setting means is automatically operated and when the operator does not actuate said manually operable means.

25. In a camera as recited in claim 1, said exposure time setting means and said aperture setting means both being rotary and said selectively operable means including selecting means cooperating with said exposure time and aperture setting means for selectively operating the latter automatically or manually, said exposure time setting means being operable only manually in the B position when said selecting means is set for manual operation.

26. In a camera, in combination, manually operable means for setting into operation structure which is capable of setting the camera automatically; manually operable shutter tripping means; support means; blocking means carried by said support means for movement between a blocking position blocking operation of said shutter tripping means and an unblocking position freeing said tripping means for manual operation, said blocking means having a pair of camming portions; first manually operable cam means cooperating with one of said camming portions of said blocking means to locate the latter in said blocking position at the option of the operator; and second cam means carried by and movable with said first-mentioned manually operable means and cooperating with the other of said camming portions for moving said blocking means from said blocking to said unblocking position during actuation of said first-mentioned manually operable means.

References Cited in the file of this patent
UNITED STATES PATENTS

| | | |
|---|---|---|
| 2,780,971 | Fahlenberg | Feb. 12, 1957 |
| 2,868,095 | Gebele | Jan. 13, 1959 |
| 2,900,886 | Gebele | Aug. 25, 1959 |
| 2,913,969 | Faulhaber | Nov. 24, 1959 |
| 2,923,216 | Greger | Feb. 2, 1960 |
| 2,925,760 | Broschke | Feb. 23, 1960 |
| 2,969,004 | Gebele | Jan. 24, 1961 |